United States Patent
Sorensen

(10) Patent No.: US 12,540,559 B2
(45) Date of Patent: Feb. 3, 2026

(54) sCO2 POWER CONVERSION SYSTEM

(71) Applicant: Flibe Energy, Inc., Huntsville, AL (US)

(72) Inventor: Kirk Frederick Sorensen, Huntsville, AL (US)

(73) Assignee: Flibe Energy, Inc., Huntsville, AL (US)

( * ) Notice: Subject to any disclaimer, the term of this patent is extended or adjusted under 35 U.S.C. 154(b) by 97 days.

(21) Appl. No.: 18/438,103

(22) Filed: Feb. 9, 2024

(65) Prior Publication Data
US 2024/0271544 A1    Aug. 15, 2024

Related U.S. Application Data

(60) Provisional application No. 63/484,118, filed on Feb. 9, 2023.

(51) Int. Cl.
*F01D 15/10* (2006.01)
*H02K 7/18* (2006.01)

(52) U.S. Cl.
CPC .......... *F01D 15/10* (2013.01); *H02K 7/1823* (2013.01)

(58) Field of Classification Search
CPC .............................. F01D 15/10; H02K 7/1823
USPC ...................................................... 290/43, 54
See application file for complete search history.

(56) References Cited

U.S. PATENT DOCUMENTS

| | | | | |
|---|---|---|---|---|
| 8,904,791 | B2 * | 12/2014 | Lehar | F01K 25/103 60/671 |
| 11,538,600 | B2 * | 12/2022 | Filippone | G21D 1/006 |
| 11,629,637 | B2 * | 4/2023 | Holley | F01K 25/103 60/39.181 |
| 2003/0029169 | A1 * | 2/2003 | Hanna | F24D 18/00 60/671 |
| 2003/0213245 | A1 * | 11/2003 | Yates | F01K 17/02 60/671 |
| 2003/0213248 | A1 * | 11/2003 | Osborne | F28F 9/0275 60/671 |

(Continued)

FOREIGN PATENT DOCUMENTS

EP    4148345 A1 *    3/2023    .............. F25B 40/00

OTHER PUBLICATIONS

Bahrami, M., "Brayton Cycle," Available at https://www.sfu.ca/~mbahrami/ENSC%20461/Notes/Brayton%20Cycle.pdf as early as Jul. 8, 2011, 7 pages.

*Primary Examiner* — Charles Reid, Jr.
(74) *Attorney, Agent, or Firm* — Christensen O'Connor Johnson Kindness PLLC

(57) ABSTRACT

A power conversion system includes a closed first loop and a closed second loop. The first loop includes a first compressor, a first recuperator in parallel with an interloop heat exchanger, a first heater, a first turbine, and the first recuperator arranged in series. The first recuperator transfers enthalpy from an expanded portion of a first working fluid to a compressed portion of the first working fluid. The second loop includes a second compressor, a second recuperator, a second heater, a second turbine, the second recuperator, and the interloop heat exchanger, arranged in series. The second recuperator transfers enthalpy from an expanded portion of a second working fluid to a compressed portion of the second working fluid, and the interloop heat exchanger transfers enthalpy from the second working fluid to the first working fluid.

18 Claims, 3 Drawing Sheets

(56) References Cited

U.S. PATENT DOCUMENTS

| | | | | |
|---|---|---|---|---|
| 2004/0123602 | A1* | 7/2004 | Bunker | F02C 3/04 |
| | | | | 60/782 |
| 2004/0226296 | A1* | 11/2004 | Hanna | F01K 25/08 |
| | | | | 60/671 |
| 2007/0214766 | A1* | 9/2007 | Obana | F02C 7/143 |
| | | | | 60/39.15 |
| 2014/0103661 | A1* | 4/2014 | Kacludis | F02C 1/04 |
| | | | | 290/54 |
| 2015/0069758 | A1* | 3/2015 | Davidson | F01K 25/10 |
| | | | | 60/659 |
| 2017/0363002 | A1* | 12/2017 | Hwang | F01K 11/02 |
| 2019/0120088 | A1* | 4/2019 | Öström | F01K 23/08 |
| 2019/0277164 | A1* | 9/2019 | Kozlov | F01K 21/005 |
| 2021/0355922 | A1* | 11/2021 | Radke | F03G 7/04 |
| 2022/0042424 | A1* | 2/2022 | Radke | F03G 6/071 |
| 2022/0153426 | A1* | 5/2022 | Holley | F01K 25/103 |

* cited by examiner sCO2 POWER CONVERSION SYSTEM

CROSS-REFERENCE TO RELATED APPLICATIONS

This application claims the benefit of U.S. Provisional Patent Application No. 63/484,118, filed on Feb. 9, 2023, the disclosure of which is incorporated herein in its entirety.

BACKGROUND

In 2022, the United States generated 4,231 billion kilowatt-hours of electricity at utility-scale facilities (Energy Information Administration (EIA) estimate). The most significant sources of electricity generation were natural gas (39.9%), coal (19.7%), and nuclear power (18.2%), totaling 77.8%, with the majority of the remainder being generated by a combination of wind, hydropower, and solar. Natural gas, coal, and nuclear power each utilize some form of power conversion system to generate electricity from their thermal energy input. Known power conversion systems predominantly use steam generators and are based on the Rankine cycle. In a steam generator, pressurized water is heated and then allowed to expand into steam. This expansion turns a turbine that rotates a shaft to power an electric (alternating current) generator. Rankine steam cycle thermal-to-electric efficiencies have an upper limit near 42%, meaning for every 10 watts of thermal energy input, only 4.2 watts are harnessed as electricity. In practice, these systems typically achieve around 35% thermal-to-electric efficiency. The Carnot cycle is the ideal power conversion cycle and other cycles attempt to achieve that ideal efficiency in various ways. New and better power cycles are needed to approach the ideal for electrical power generation.

One such system of interest is the Brayton cycle, a thermodynamic cycle involving gaseous working fluids, most commonly implemented as an aircraft jet engine or open-cycle Brayton. The two versions of the closed-cycle Brayton that have garnered the most attention and research are based on using either helium gas or supercritical carbon dioxide (sCO2) to turn a gas turbine attached to a generator by a shaft. Helium Brayton cycles only achieve significantly improved efficiencies at very high turbine inlet temperatures, e.g., on the order of 850 to 900° C., and as such, would require very specific thermal energy sources to make it an attractive cycle. Supercritical carbon dioxide Brayton cycles can reach desirable thermal-to-electric efficiencies with a much lower maximum cycle temperature. These sCO2 Brayton cycles can operate at turbine inlet temperatures of just 500° C., with further efficiency improvements being achievable with increased inlet turbine temperatures.

Carbon dioxide ($CO_2$) has a critical temperature and pressure of 30.98° C. (304.13K) and 7.38 MPa (73.8 bar), respectively. The supercritical nature of the gas in a Brayton cycle indicates that it operates in the region above that temperature and pressure. Near the critical point, the fluid behavior of $CO_2$ varies significantly with small changes in temperature and pressure rather than as an ideal gas. As a result, the $CO_2$ can be compressed relatively easily near the critical point.

Due to the nature of sCO2, many optimizations can be made to the Brayton cycle to increase cycle efficiency. The simplest version of a sCO2 Brayton cycle contains a compressor, a gas heater, a turbine (and generator), and a gas cooler. $CO_2$ enters the compressor near the critical point, is compressed, then heated by a thermal energy source such as a nuclear reactor. The $CO_2$ then enters a turbine where it is allowed to expand. Expansion of the $CO_2$ turns the turbine blades while decreasing the pressure and temperature of the fluid. The gas is then cooled and recirculated through the compressor. However, this simple cycle has a very low cycle efficiency that does not approach the best efficiency of a steam Rankine cycle.

Recuperators may be used to improve the efficiency of Brayton cycles, and sCO2 Brayton cycles in particular. The recuperator is a heat exchanger that transfers some of the heat from the high temperature, low pressure $CO_2$ stream leaving the turbine to the low temperature, high-pressure stream exiting the compressor. These recuperators are effectively preheaters for the compressed sCO2. Recuperators facilitate the recovery of enthalpy that would otherwise go unused after the fluid has expanded in a turbine by allowing the low-pressure stream to heat the high-pressure stream. These regenerative or recuperative Brayton cycles achieve cycle efficiencies similar to a steam Rankine cycle, albeit at higher turbine inlet temperatures.

Recompression Brayton cycles further improve the cycle efficiency of recuperative Brayton cycles by adding a second recuperator and a second compressor (recompressor). In a recompression Brayton cycle, a portion of the flow of the low-pressure stream is diverted after it leaves the second recuperator, sending the majority of the flow to the gas cooler as in a regenerative or simple cycle. The remainder of the flow enters a recompressor, where compressive work is done on the fluid, which enters at a higher temperature than the recompressor. The $CO_2$ then leaves the recompressor and rejoins with the primary stream after it has passed through the second recuperator as the high-pressure stream. This recompressive cycle can reach a higher efficiency than a steam Rankine cycle beginning at turbine inlet temperatures of around 500° C., with higher thermal-to-electric conversion efficiencies reached and the gap widening with further temperature increases.

SUMMARY

The present disclosure provides examples of a power conversion system that converts thermal energy into mechanical energy. The mechanical energy can drive one or more generators to generate electrical power. In an embodiment, power conversion system includes a closed first loop and a closed second loop. The first loop includes a first compressor, a first recuperator in parallel with an interloop heat exchanger, a first heater, a first turbine, and the first recuperator arranged in series. The first recuperator transfers enthalpy from an expanded portion of a first working fluid to a compressed portion of the first working fluid. The second loop includes a second compressor, a second recuperator, a second heater, a second turbine, the second recuperator, and the interloop heat exchanger, arranged in series. The second recuperator transfers enthalpy from an expanded portion of a second working fluid to a compressed portion of the second working fluid, and the interloop heat exchanger transfers enthalpy from the second working fluid to the first working fluid.

In any embodiment, the first loop further comprises a second recuperator, the second recuperator being configured to transfer enthalpy from an expanded portion of the first working fluid located between the first recuperator and the first turbine to a compressed portion of the first working fluid located between the first recuperator and the first heater.

In any embodiment, the at least one of the first and second turbines is coupled to a generator so that rotation of the turbine drives the generator to generate electrical power.

In any embodiment, the first and second turbines are coupled to first and second generators, respectively, rotation of each of the first and second turbines driving the corresponding generator of the first and second generators to generate electrical power.

In any embodiment, the first working fluid is sCO2.

In any embodiment, the second working fluid is sCO2.

In any embodiment, a temperature of the first working fluid entering the first turbine is approximately 600° C.

In any embodiment, a temperature of the second working fluid entering the second turbine is approximately 600° C.

In any embodiment, a maximum pressure of the first and second working fluids is 200 bar.

In any embodiment, a minimum pressure of the first and second working fluids is 77 bar.

In any embodiment, the first heater and the second heater are part of closed heating loop having a third working fluid.

In any embodiment, the heating loop further includes a thermal energy source configured to provide enthalpy to the third working fluid.

In any embodiment, the first and second heaters are arranged in parallel.

In any embodiment, the thermal energy source comprises a nuclear reactor.

In any embodiment, the third working fluid is sCO2.

In any embodiment, the second loop is configured to provide power to start the first loop at startup.

In any embodiment, the second loop further includes a second cooler disposed between interloop heat exchanger and the second compressor.

In any embodiment, the first loop is configured to provide power to start the second loop at startup.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of present disclosure will become more readily appreciated as the same become better understood by reference to the following detailed description, when taken in conjunction with the accompanying drawings, wherein.

DETAILED DESCRIPTION

Embodiments of the disclosed subject matter are directed to a power conversion system that generates electrical power from a high-temperature thermal energy source. In an embodiment of the power conversion system, a main loop functions in the manner of a modified recuperative Brayton cycle. A secondary loop also functions as a modified recuperative Brayton cycle that produces additional electrical power while also helping preheat the compressed working fluid of the main loop. In some embodiments, the system uses sCO2 as the working fluid.

Figure 1:
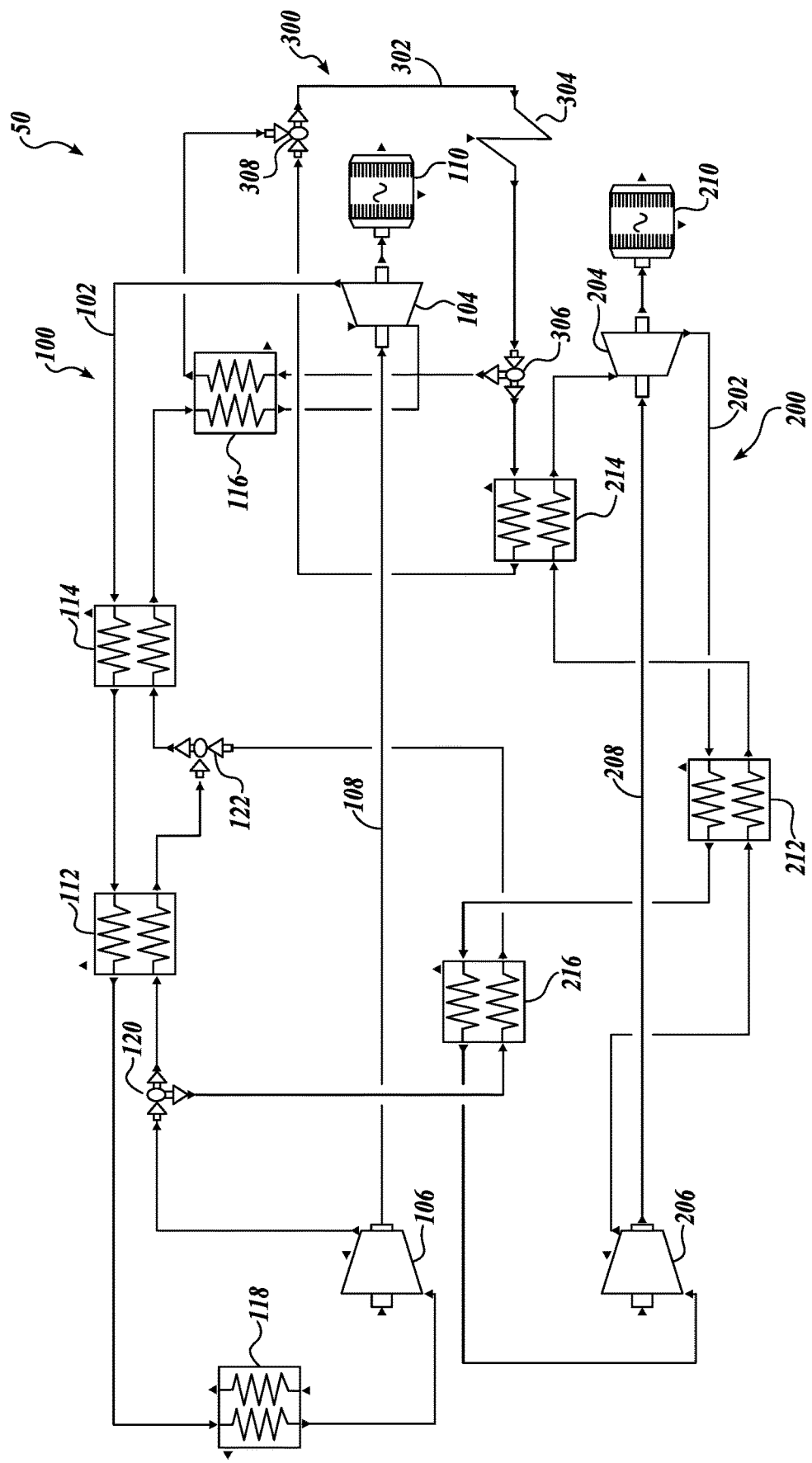
FIG. 1 shows a schematic view of a representative embodiment of a power conversion system according to aspects of the present disclosure.

Referring to FIG. 1, an embodiment of a power conversion system 50 is shown. As will be described in further detail, the power conversion system 50 includes a main loop 100 that utilizes a working fluid 102. In the illustrated embodiment, the working fluid 102 is carbon dioxide (CO2). More specifically, the working fluid 102 is supercritical CO2 (sCO2), i.e., CO2 at a temperature above its critical temperature and at a pressure above its critical pressure. It will be appreciated that other working fluids may be used and should be considered within the scope of the present disclosure.

Generally speaking, the main loop 100 operates in the manner of a modified closed Brayton cycle. In this regard, the main loop includes a turbine 104 coupled to a compressor 106 by a shaft 108. The shaft 108 connects the turbine 104 and the compressor 106 such that expansion of the first working fluid 102 through the turbine 104 rotates the shaft 108. Rotation of the shaft 108 drives the compressor 106 to compress the working fluid 102 during operation of the system 50. The turbine 104 is also coupled to a generator 110 so that expansion of the working fluid 102 through the turbine also drives the generator to generate electrical power.

Starting at the compressor 106, the path of the working fluid 102 through the main loop 100 will now be described. Expanded, low-temperature working fluid 102 is received and compressed by the compressor 106. The flow of compressed working fluid 102 discharged from the compressor is split at a junction 120 so that a portion of the working fluid is provided to a low-temperature recuperator 112, i.e., a heat exchanger, and the remaining working fluid is provided to an interloop heat exchanger 216. The portion of compressed working fluid 102 passing through the recuperator 112 is pre-heated by expanded working fluid 102 in another portion of the main loop 100. The portion of compressed working fluid 102 passing through interloop heat exchanger 216 is pre-heated by expanded working fluid 202 in a secondary loop 200, which will be described in further detail below.

The pre-heated, compressed working fluid 102 that has passed through the recuperator 112 is recombined at a junction 122 with the pre-heated, expanded working fluid 102 that has passed through the interloop heat exchanger 216. The working fluid 102 then passes from the junction 122 through a high-temperature recuperator 114. The compressed, pre-heated working fluid 102 is further pre-heated in the high-temperature recuperator 114 by expanded working fluid 102 from another portion of the main loop 100.

The working fluid 102 next passes through a heater 116 that raises the temperature of the working fluid to a design temperature. In the illustrated embodiment, the design temperature is approximately 600° C. (873.15 K), however, it will be appreciated that the design temperature can be any suitable temperature. As previously discussed, the heated, compressed working fluid 102 is expanded through the turbine 104 to drive the compressor 106 and the generator 110.

The expanded working fluid 102 exits the turbine 104 and then passes through the previously described high-temperature recuperator 114 and low-temperature recuperator 112 to pre-heat the compressed working fluid 102 moving from the compressor 106 to the turbine 104. The expanded working fluid 102 is then further cooled by a cooler 118 that lowers the temperature of the working fluid to near the critical temperature. The cooled working fluid 102 is then returned to the compressor 106 to begin the main loop cycle again. In some embodiments, the enthalpy removed by the cooler 118 is recovered. In some embodiments, the enthalpy removed by the cooler 118 is radiated to the ambient environment.

Still referring to FIG. 1, the power conversion system 50 further includes a secondary loop 200 that works in conjunction with the main loop 100. Similar to the main loop 100, the secondary loop 200 utilizes a working fluid 202. In the illustrated embodiment, the working fluid 102 is sCO2. In some embodiments one or both working fluids 102, 202 are any suitable working fluid or fluids, respectively, other than sCO2, and such embodiments should be considered within the scope of the present disclosure.

The secondary loop 200 includes a turbine 204 coupled to a compressor 206 by a shaft 208. The shaft 208 connects the turbine 204 and the compressor 206 such that expansion of the second working fluid 202 through the turbine 204 rotates the shaft 208. Rotation of the shaft 208 drives the compressor 206 to compress the working fluid 202 during operation of the system 50. The turbine 204 is also coupled to a generator 210 so that expansion of the working fluid 202 through the turbine also drives the generator to generate electrical power.

Starting at the compressor 206, the path of the working fluid 202 through the secondary loop 200 will now be described. Expanded, low-temperature working fluid 202 is received and compressed by the compressor 206. The flow of compressed working fluid 102 discharged from the compressor 206 is passed through a recuperator 212, wherein the working fluid 202 is pre-heated by expanded working fluid 202 in another portion of the secondary loop 200.

The pre-heated, expanded working fluid 202 is then passed through a heater 214 that raises the temperature of the working fluid 202 to a design temperature. In the illustrated embodiment, the design temperature is approximately 600° C. (873.15 K), however, it will be appreciated that the design temperature can be any suitable temperature. In some embodiments the design temperature of one or both working fluids 102, 202 is any suitable temperature higher than the critical temperature of the corresponding working fluid. The heated, compressed working fluid 202 is expanded through the turbine 204 to drive the compressor 206 and the generator 210.

The expanded working fluid 202 exits the turbine 204 and then passes through the previously described recuperator 212 to pre-heat the compressed working fluid 202 moving from the compressor 206 to the turbine 204. The expanded working fluid 202 then passes through the previously described interloop heat exchanger 216 to provide heat that pre-heats a portion of the compressed working fluid 102 exiting the compressor 106. The cooled working fluid 202 is then returned to the compressor 206 to begin the secondary loop cycle again.

Still referring to FIG. 1, the power conversion system 50 includes a heating loop 300 that powers the heaters 116, 214 of the main and secondary loops 100, 200, respectively. The heating loop 300 uses a working fluid 302 to transfer heat from a thermal energy source 304 to the heaters 116, 214. In the illustrated embodiment, the thermal energy source can include one or more of: nuclear reactors, thermal solar panels, internal combustion devices, or any other suitable heat source. Heat from the thermal energy source 304 heats the working fluid 302. The heated working fluid 302 is split into two portions at a junction 306 and provided to the heaters 116 and 214, which are arranged in parallel. After providing heating to the first and second working fluids 102, 202 of the main loop 100 and the secondary loop 200, respectively, the first and second portions of the third working fluid 302 are recombined at junction 308 and returned to thermal energy source 304 to be heated again.

Figure 2:
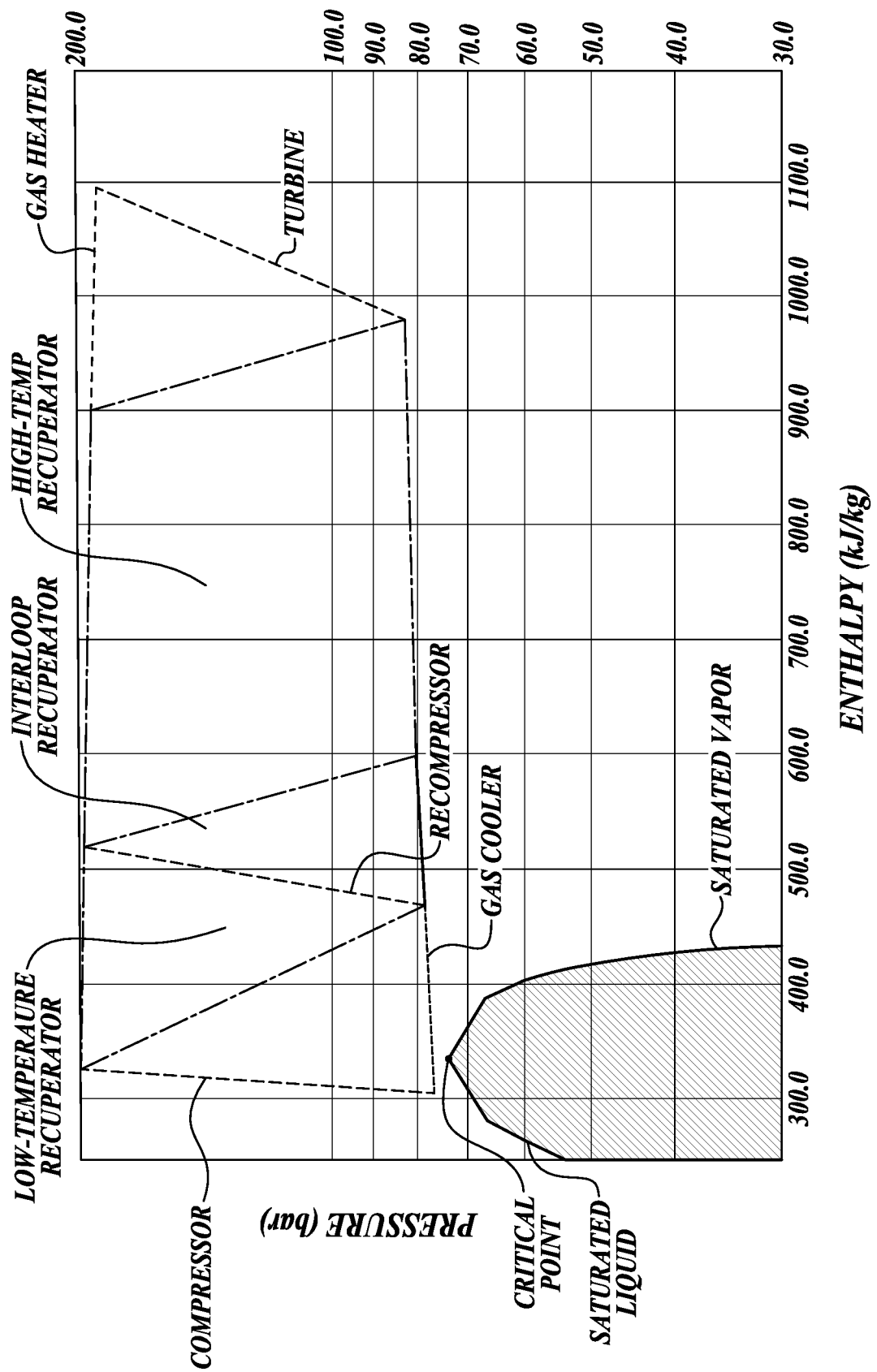
FIG. 2 shows pressure-enthalpy diagram of the power conversion system of FIG. 1.
Figure 3:
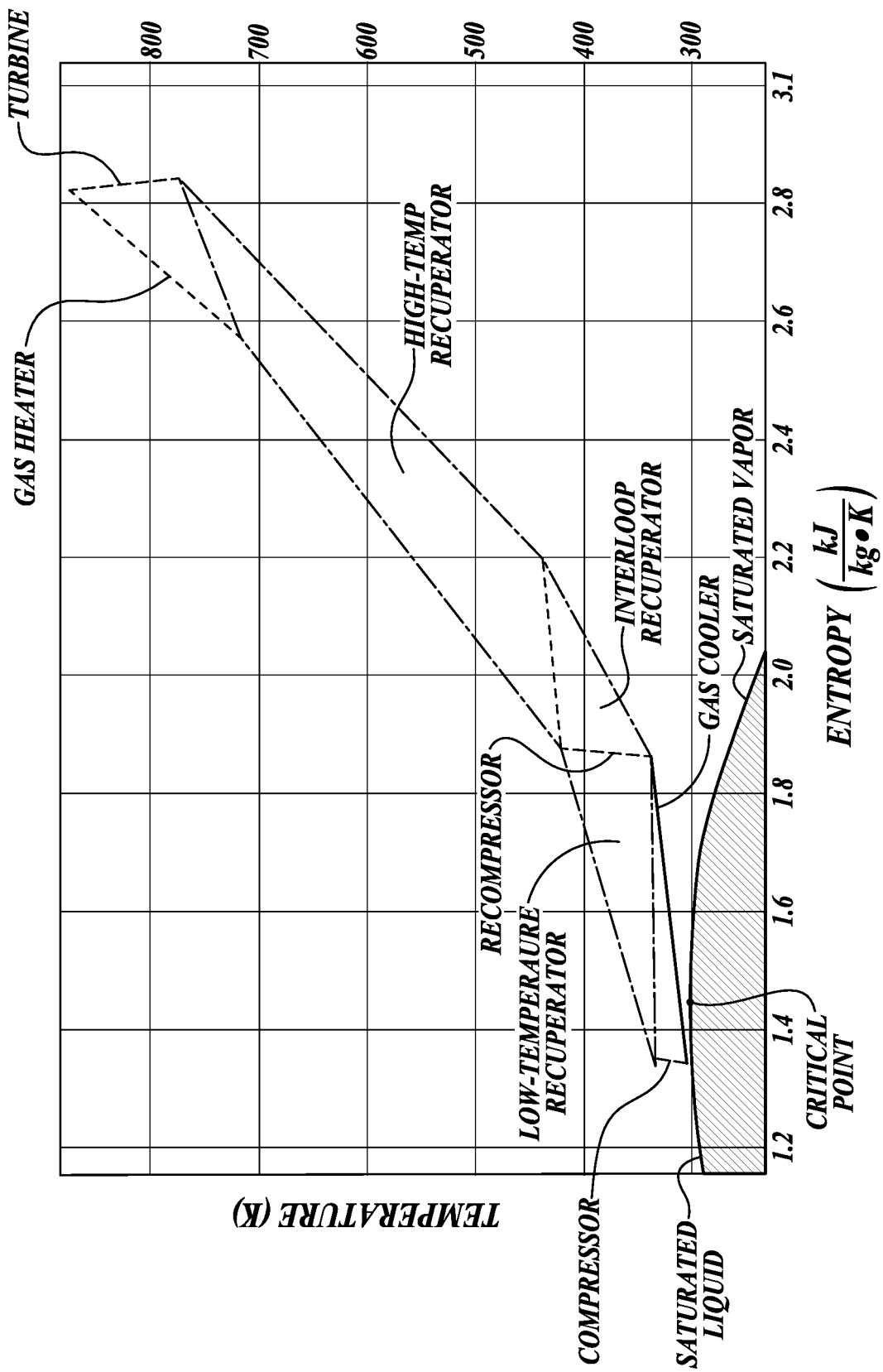
FIG. 3 shows a temperature-entropy diagram of the power conversion system of FIG. 1.

Referring now to FIGS. 2 and 3, operating parameters of an embodiment of the power conversion system 50 are shown, wherein FIG. 2 shows a pressure-enthalpy diagram, and FIG. 3 shows a temperature-entropy diagram. In some embodiments, the turbine inlet temperature at one or both turbines is 600° C. (873.15 K). In some embodiments, the maximum cycle pressure is 200 bar, and/or the minimum cycle pressure is 77 bar.

Embodiments of the disclosed power conversion system have been found to have improved thermodynamic efficiencies as compared to known systems. In some embodiments, at least a portion of the turbine output is utilized as mechanical power, such as to drive a pump, a motor, or any other machine that utilizes rotational input.

Embodiments of the disclosed power conversion system 50 can provide more cost-effective startup as compared to known systems. In some embodiments, during startup of the power conversion system 50, the secondary loop 200 is started before the main loop 100. Power generated by the second loop 200 is then used to start the main loop 100. In some embodiments, the power from the secondary loop 200 used to start the main loop 100 may be electrical power or mechanical power. In some embodiments, secondary loop 200 includes a second cooler that cools the second working fluid 202 exiting the interloop heat exchanger 216 before the second working fluid enters the second compressor 206. In some embodiments, during startup of the power conversion system 50, the main loop 100 is started before the secondary loop 200, and power from the main loop is used to start the secondary loop.

While illustrative embodiments have been illustrated and described, it will be appreciated that various changes can be made therein without departing from the spirit and scope of the invention.

It will be appreciated that the disclosed embodiments are exemplary only and should not be considered limiting. In some embodiments, the type and arrangement of the compressor, the recuperator, the heat exchanger, the heater, and the turbine can vary within the scope of the present disclosure. These and other variations are contemplated and should be considered within the scope of the present disclosure.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A power conversion system, comprising:
   a first loop having, arranged in seriatim, a first compressor, a first recuperator in parallel with an interloop heat exchanger, a first heater, a first turbine, the first recuperator, and a first cooler, the first loop being a closed loop containing a first working fluid, the first recuperator transferring enthalpy from an expanded portion of the first working fluid to a compressed portion of the first working fluid; and
   a second loop having, arranged in seriatim, a second compressor, a second recuperator, a second heater, a second turbine, the second recuperator, and the interloop heat exchanger, the second loop being a closed loop containing a second working fluid, the second recuperator transferring enthalpy from an expanded portion of the second working fluid to a compressed portion of the second working fluid, the interloop heat exchanger transferring enthalpy from the second working fluid to the first working fluid.

2. The power conversion system of claim 1, wherein the first loop further comprises a second recuperator, the second recuperator being configured to transfer enthalpy from the expanded portion of the first working fluid located between the first recuperator and the first turbine to the compressed portion of the first working fluid located between the first recuperator and the first heater.

3. The power conversion system of claim 1, wherein at least one of the first and second turbines is coupled to a generator so that rotation of the turbine drives the generator to generate electrical power.

4. The power conversion system of claim 1, wherein the first and second turbines are coupled to a first generator and a second generator, respectively, rotation of each of the first and second turbines driving the corresponding generator of the first and second generators to generate electrical power.

5. The power conversion system of claim 1, wherein the first working fluid is sCO2.

6. The power conversion system of claim 5, wherein the second working fluid is sCO2.

7. The power conversion system of claim 6, wherein a temperature of the first working fluid entering the first turbine is approximately 600° C.

8. The power conversion system of claim 7, wherein a temperature of the second working fluid entering the second turbine is approximately 600° C.

9. The power conversion system of claim 6, wherein a maximum pressure of the first and second working fluids is 200 bar.

10. The power conversion system of claim 9, wherein a minimum pressure of the first and second working fluids is 77 bar.

11. The power conversion system of claim 1, wherein the first heater and the second heater are part of a closed heating loop having a third working fluid.

12. The power conversion system of claim 11, wherein the heating loop further includes a thermal energy source configured to provide enthalpy to the third working fluid.

13. The power conversion system of claim 12, wherein the thermal energy source comprises a nuclear reactor.

14. The power conversion system of claim 11, wherein the first and second heaters are arranged in parallel.

15. The power conversion system of claim 11, wherein the third working fluid is sCO2.

16. The power conversion system of claim 1, wherein the second loop is configured to provide power to start the first loop at startup.

17. The power conversion system of claim 16, wherein the second loop further includes a second cooler disposed between the interloop heat exchanger and the second compressor.

18. The power conversion system of claim 1, wherein the first loop is configured to provide power to start the second loop at startup.

* * * * *